US012631554B1

(12) United States Patent
Sarma et al.

(10) Patent No.: US 12,631,554 B1
(45) Date of Patent: May 19, 2026

(54) INTEGRATED PHOTONIC ENCODING SYSTEMS AND METHODS FOR HIGH SPEED AND LOW POWER IMAGE PROCESSING

(71) Applicants: National Technology & Engineering Solutions of Sandia, LLC, Albuquerque, NM (US); Arizona Board of Regents on Behalf of the University of Arizona, Tech Launch Arizona, Tucson, AZ (US); U.S. Naval Research Laboratory, Washington, DC (US)

(72) Inventors: Raktim Sarma, Albuquerque, NM (US); Jayson Briscoe, Niskayuna, NY (US); Michael Goldflam, Oceanside, CA (US); Nicholas Karl, Albuquerque, NM (US); Christopher Long, Albuquerque, NM (US); Brandon Redding, University Park, MD (US); David Brady, Tucson, AZ (US)

(73) Assignees: National Technology & Engineering Solutions of Sandia, LLC, Albuquerque, NM (US); US Naval Research Laboratory, Washington, DC (US); Arizona Board of Regents on Behalf of the University of Arizona, Tech Launch Arizona, Tucson, AZ (US)

( * ) Notice: Subject to any disclaimer, the term of this patent is extended or adjusted under 35 U.S.C. 154(b) by 453 days.

(21) Appl. No.: 18/218,704

(22) Filed: Jul. 6, 2023

(51) Int. Cl.
*G01N 21/47* (2006.01)
*H04B 10/516* (2013.01)

(52) U.S. Cl.
CPC ....... *G01N 21/4795* (2013.01); *H04B 10/516* (2013.01); *G01N 2021/4797* (2013.01)

(58) Field of Classification Search
None
See application file for complete search history.

(56) References Cited

U.S. PATENT DOCUMENTS

| | | | |
|---|---|---|---|
| 7,570,844 | B2 | 8/2009 | Handelman |
| 10,015,510 | B1 | 7/2018 | Navarrete Michelini et al. |
| 10,735,724 | B2 | 8/2020 | Choi et al. |
| 10,896,522 | B2 | 1/2021 | Weng |
| 2018/0315165 | A1 | 11/2018 | Navarrete Michelini et al. |
| 2019/0356394 | A1* | 11/2019 | Bunandar ................. G02F 1/21 |

OTHER PUBLICATIONS

Liutkus, et al., "Imaging with Nature: Compressive Imaging Using a Multiply Scattering Medium", Scientific Reports, 2014, 7 pages.

* cited by examiner

*Primary Examiner* — Mark R Milia
(74) *Attorney, Agent, or Firm* — Calfee, Halter & Griswold LLP; Samantha Updegraff; Merle W. Richman

(57) ABSTRACT

A method performed by a photonics processing system includes encoding an input vector into first optical signals; performing an optical scattering of the first optical signals to form second optical signals, the optical scattering implementing a matrix multiplication of the input vector by a quasi-random matrix; detecting at least a portion of the second optical signals representing an output vector; and encoding the second optical signals in an electrical representation of the output vector.

13 Claims, 8 Drawing Sheets

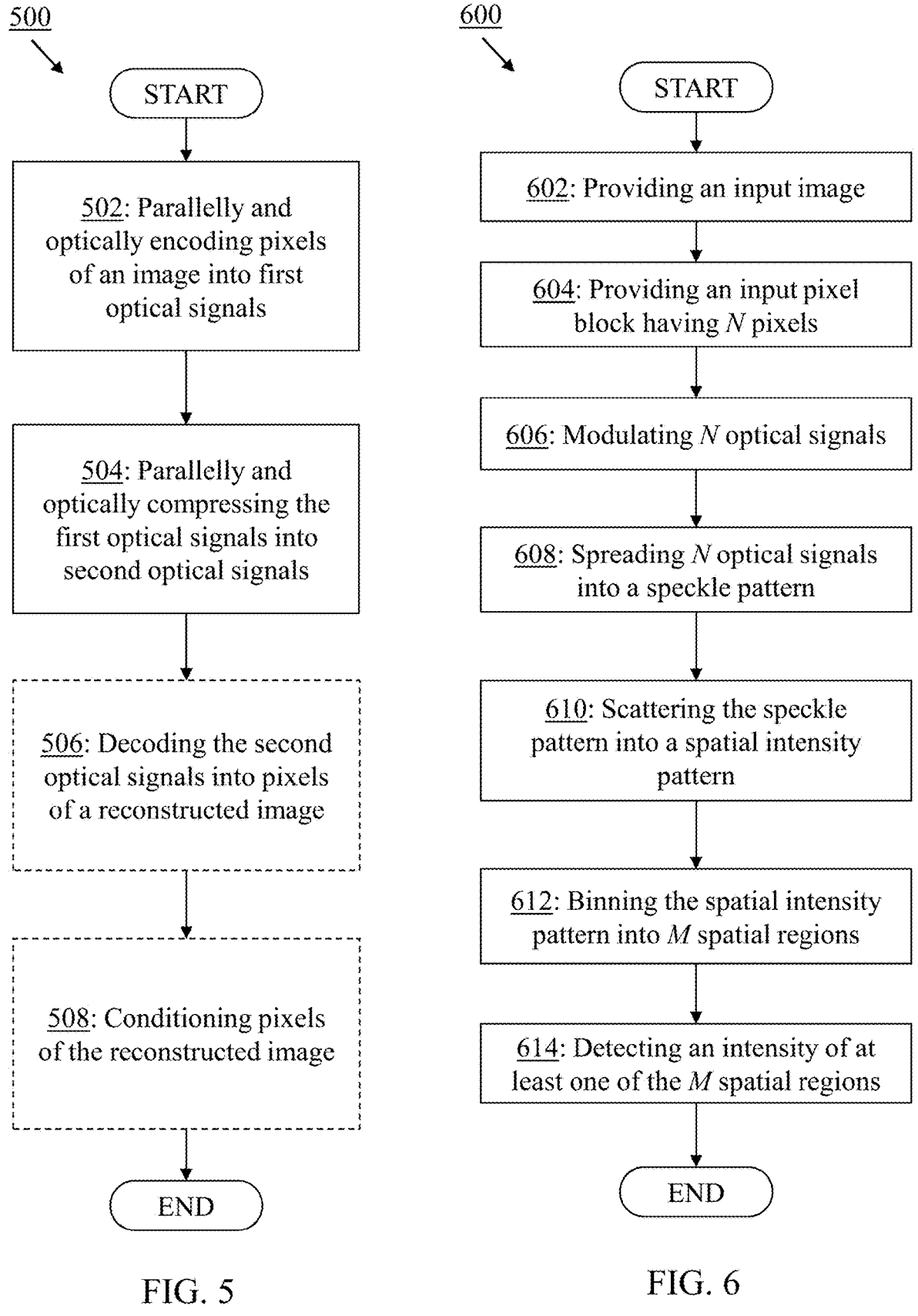
FIG. 5                    FIG. 6

802

804

806

808

INTEGRATED PHOTONIC ENCODING SYSTEMS AND METHODS FOR HIGH SPEED AND LOW POWER IMAGE PROCESSING

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

From the invention of photography until the early 1990s, the function of a camera was to record physical images on a paper medium. With the development of solid-state focal planes and digital coding, however, this function changed, such that digital cameras act as transceivers that collect ever increasing amounts of data and transform massively parallel optical data streams into serial coded electronic data that is processed 1 pixel at a time. While this paradigm shift introduced numerous advantages, the power consumption associated with electronic digital processing is now the bottleneck limiting image data acquisition rates. In contrast, compact lens designs are capable of resolving >10 gigapixels of transverse resolution, while advances in multimodal imaging systems capable of acquiring spectral, polarization, temporal, and range information has created the requirement for future imaging systems to acquire $10^{12}$ pixels (i.e., terapixels) per second of data. However, the power consumption and resulting coding capacity of opto-electronic transceivers is the primary barrier to achieving such systems.

In conventional digital electronics-based image processing systems, electrical power consumption is proportional to the number of mathematical operations performed on each pixel. Conventional image signal processing (ISP) systems perform 100-1000 operations per pixel to first condition (e.g., compensate for pixel non-uniformity, hot-pixels, denoising etc.) and then compress the image data stream, resulting in a per pixel energy cost of 0.1-1 microjoule.

This approach is associated with suboptimal speed and relatively high power consumption. In addition, while image compression is required for most remote sensing applications, many of these pixel conditioning operations are performed at the front end regardless of whether they are necessary for a given application; hence, additional processing resources are unnecessarily consumed.

SUMMARY

The following is a summary of subject matter that is described in greater detail herein. This summary is not intended to be limiting as to the scope of the claims.

Described herein are various technologies pertaining to photonic processing systems and methods associated therewith. The photonic processing systems and methods described herein address problems and/or provide advantages over conventional electronic image signal processing systems and methods.

The photonic processing systems and methods rely on an auto-encoder neural network framework in which a compressed image is formed at a "bottleneck" layer in a neural network. In the photonics processing systems and methods, the first half of the neural network (mapping the original image data to the compressed image at the bottleneck layer)

is implemented optically using analog photonics. The second half of the neural network (reconstructing the image) may be implemented using digital electronics or by any other suitable processing means. Reconstructing the compressed image generated by the photonics processing systems and methods can yield a reconstructed image with an average peak signal-to-noise ratio (PSNR) of about 25 dB or higher and/or a structural similarity exceeding about 90% relative to the original image. The photonic processing systems and methods allow for parallel processing of pixels of image data with relatively low power consumption and with the ability to selectively move image conditioning operations from an encoding front end stage to a decoding stage. In the context of neural processing, encoding the pixels and parallelly processing the pixels can be described as implementing a matrix multiplication operation of a vector, representing the encoded pixels, and an encoding matrix, representing the parallel processing. Thus, the photonic processing system described herein is able to perform large-scale matrix multiplication in an energy-efficient manner with the encoding matrix being designed such that encoded data can be decoded with high-fidelity for post-processing, such as reconstructing compressed images and image conditioning such as denoising. In some embodiments, image conditioning operations (e.g., denoising) may be selectively moved from an encoding stage at a front end of a processing pipeline to a decoding stage later in the processing pipeline.

Further, a photonic processing system described herein can encode terapixel per second data streams while utilizing less than about 100 femtojoules per pixel. The system can perform image compression with a compression ratio as large as about 4:1 or greater with power consumption significantly lower than conventional electronic approaches, such as those using graphics processing units (GPUs). The quality of image compression performed by the system is comparable to conventional electronic compression techniques such as JPEG image compression. The photonic processing system is scalable to large-pixel images (e.g., images having pixels on the order of terapixels) and may be over 1000 times more energy efficient compared to conventional electronic approaches.

Many neural encoding networks are not very sensitive to details of the feature map (i.e., the weights and connections) implemented by the first few layers of the networks. In fact, it has been discovered that the first few layers can often be assigned random weights and connections without compromising encoding performance. The photonic processing system described herein takes advantage of this discovery and utilizes a pre-designed passive photonic device to perform local quasi-random encoding of pixels of an image for image compression. The system can process the pixels without requiring memory access. The quasi-random encodings can then be inverted by structured backend networks (e.g., decoding and/or decompression by conventional electronic methods). This photonics system allows for selectively moving electronic processing and conditioning (e.g., denoising) from the encoding interface to the decoding interface (later in the processing pipeline). Since for most remote sensing and imaging applications, decoding usually occurs at remote cloud sites with better access to power and since data is decoded only on a "need to know" basis, this capability is highly attractive.

Moreover, applying local transformations enables the photonic processing system to be scalable to very large-pixel images (e.g., terapixel images) while retaining the source image's spatial structure in the compressed image, which allows for high-fidelity image reconstruction. For instance, a local kernel-type transformation is designed to transform a block of pixels that comprises a portion of an image. Local kernel-type transformations may be performed in series or in parallel to transform blocks of pixels to encode and/or compress an image. An advantage of such an approach is that local transformations do not mix noise associated with a given pixel (e.g., a hot pixel) to the information of all other pixels in the image, as would be the case for a global transform (i.e., transforming a block of pixels that comprises an entire image). Additionally, compared to global transformation, local transformation enables a better signal-to-noise ratio (SNR) of reconstructed images when compared to what is possible using conventional approaches.

While performing the local kernel-type transformations in a serial, block-wise fashion may reduce the overall processing speed, this local transform approach has multiple advantages compared to global transforms employing an encoding scheme, wherein information of all pixels of a source image is injected and transformed simultaneously for image processing. For example, the local transform approach allows encoding the image information in blocks, which helps in retaining the spatial structure of the source image after compression. Retaining the spatial structure of the source image increases fidelity of a reconstructed image. In another example, the local transform approach allows scaling of this encoding and compression technique to images with a large number of pixels since a processing system described herein includes N optical signal modulators, corresponding to a kernel size of N, to encode information as opposed to needing as many modulators as the number of pixels in the image. It is contemplated that any losses in overall processing speed due to the local transform approach may be at least partially recouped by parallelly processing pixel blocks by way of an increased number of optical chips (e.g., chips implementing the photonic processing system and method) working in parallel, additional processing systems, and/or wavelength division multiplexing.

The photonic processing system described herein is advantageously integrable into low size, weight, and power (SWaP) packages to enable use in a wide range of platforms, such as for applications related to remote-sensing, surveillance, global monitoring, sensing, and spectroscopy. The low power consumption and high processing speeds of the photonic processing system are beneficial for these types of applications having stringent SWaP requirements.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIGS. 3-6 depict flow diagrams that illustrate methods for performing photonic processing.

DETAILED DESCRIPTION

Figure 1:
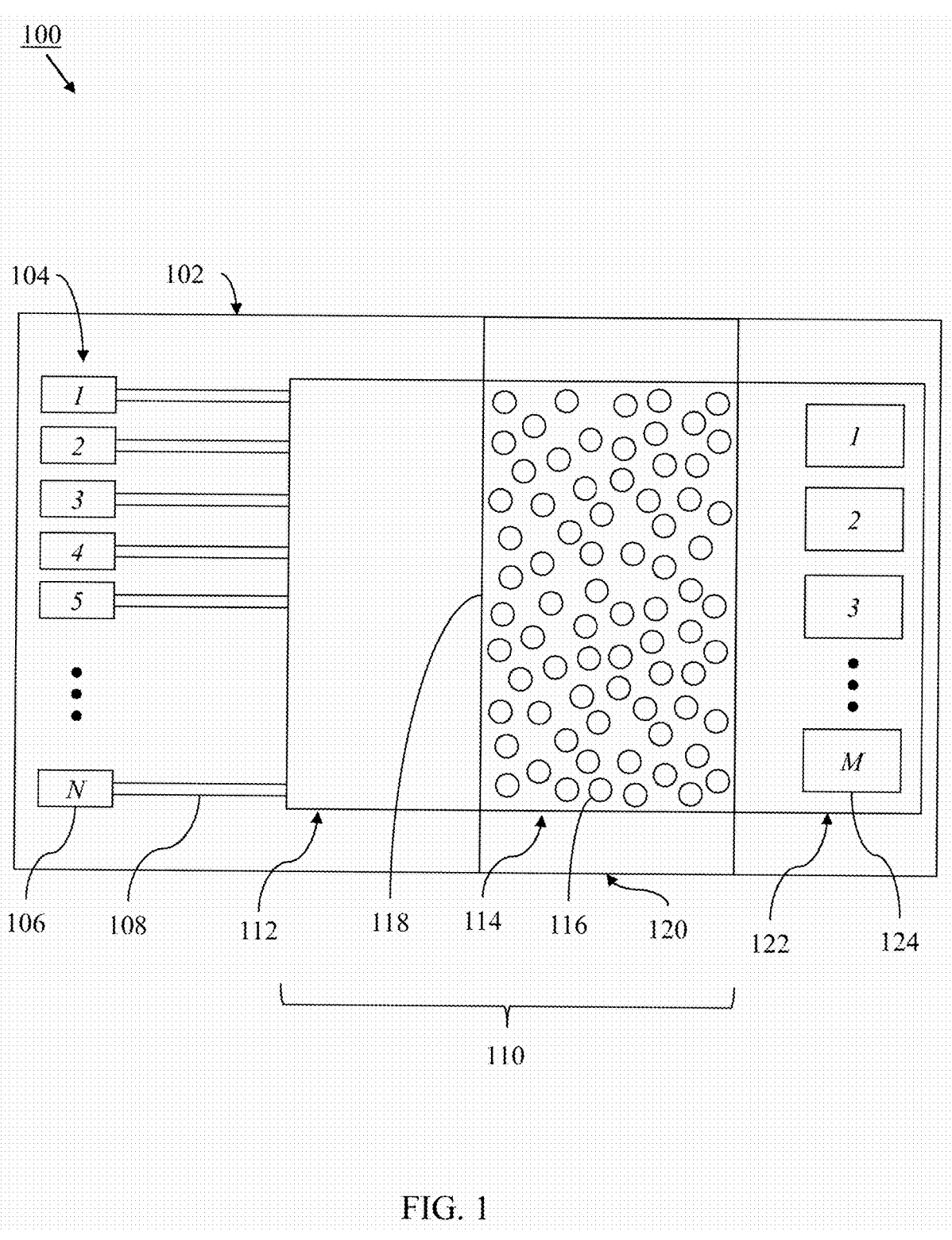
FIG. 1 is a diagram of a photonic processing system.

Various technologies pertaining to photonics processing are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something and is not intended to indicate a preference.

A photonic processing system is described herein, where the photonic processing system is configured to encode an input vector into first optical signals. For example, the photonic processing system can convert information of pixels of an image to the first optical signals via encoding using modulators (e.g., optical signal modulators), where the modulators receive the information of the pixels as the input vector and generate the first optical signals corresponding to the input vector. Further, the system can perform an optical scattering of the first optical signals to form second optical signals, detect at least a portion of the second optical signals, and output an electrical representation of an output vector. This approach allows for data (such as an image) to be processed more quickly, and with less power, than what is possible with conventional technologies.

With reference now to FIG. 1, a photonic processing system 100 is shown. The photonic processing system 100 includes a substrate 102, an optical encoder 104, a waveguide 108, a photonic processor 110, and an output port 122.

The optical encoder 104, the photonic processor 110, and/or the output port 122 are disposed on or within the substrate 102 (e.g., an integrated circuit chip, a silicon-on-insulator wafer, etc.). The optical encoder 104 is in optical communication with the photonic processor 110, and the photonic processor 110 is in optical communication with the output port 122. Briefly, the optical encoder 104 is configured to encode an input vector, such as an image or a portion of an image, into first optical signals. The photonic processor 110 is configured to receive the first optical signals, perform an optical scattering on the first optical signals to form second optical signals, and output the second optical signals, where the second optical signals represent an output vector. The optical scattering implements a matrix multiplication of the input vector by a quasi-random matrix. The output port 122 includes an optical receiver 124 (e.g., a photodetector) that is configured to detect at least a portion of the second optical signals and output an electrical representation of the output vector (e.g., a series of analog or digital signal values).

The optical encoder 104 includes an optical signal modulator 106, such as a laser engine that may be configured to emit laser chirps with a predetermined amplitude, phase, and/or frequency by applying and removing power to the laser engine. The optical encoder 104 and/or the optical signal modulator 106 are in optical communication with the photonic processor 110 by way of the waveguide 108. In other words, the optical encoder 104 may be in optical communication with the waveguide 108, and the waveguide 108 may be in optical communication with the photonic processor 110. The photonic processor 110 includes a spreading region 112 and/or a scattering region 114, wherein the scattering region 114 optionally includes a scattering center 116. Furthermore, the photonic processor 110 may include, be bordered by, and/or be enclosed by a photonic crystal 120. The photonic processor 110 is in optical communication with the output port 122, wherein the output port 122 includes the optical receiver 124.

The photonic processing system 100 can be a semiconductor-based photonic processing system, wherein the substrate 102 comprises at least one of silicon, silicon nitride (SiN), a III-V compound semiconductor, or the like. Elements of the system 100 can be formed of silicon, SiN, a III-V compound semiconductor, or the like. In an embodiment, the photonic processing system 100 is a silicon-photonic processing system, wherein, for example, the substrate 102 includes silicon and/or some of the elements of the system 100 are formed of silicon. Thus, the photonic processing system 100 can be monolithically integrated with other silicon-photonics and complementary metal-oxide semiconductor (CMOS) components, thus enabling parallelization of processing tasks. Such parallelization enables simultaneous performance of multiple image processing tasks for an input image on a single integrated circuit (IC) chip. Such parallelization may enable faster processing speeds while maintaining low power consumption when compared to serial architectures.

Moreover, the photonics processing system 100 is compatible with CMOS fabrication processes for constructing IC chips. In addition, the photonic processing system 100 is compatible with monolithic integration. For example, the photonic processing system may be fabricated by monolithically integrating at least some of the active and passive IC components on a semiconductor material comprising at least one of silicon, SiN, a III-V compound semiconductor, or the like. In other words, active and passive IC components can be formed at substantially the same time on a single piece of the semiconductor material (e.g., a single piece of silicon).

As noted above, the optical encoder 104 encodes input data (e.g., an input vector) as analog values of a characteristic of an optical signal, such as the phase or intensity of light comprising the optical signal. An analog value may be an intensity value ranging from 0 to 255. This analog optical encoding may be combined with pre-designed passive optical transformations (e.g., spreading single-mode light into multimodal light, scattering light, etc.). The photonic processing system 100 can combine analog optical computing engines with tailored passive optical transforms to perform large-scale matrix multiplications with energy consumption that scales linearly with the dimension of the input dataset (N) as opposed to the quadratic scaling (N^2) inherent to conventional electronic approaches. This superior energy efficiency can be further improved by any suitable factor, such as a factor of at least about 2, about 100, about 160, etc., by either increasing the size of the input (N) or operating multiple photonic processors in parallel. for example, by splitting the input waveguide 108. In an example, analog signals (e.g., corresponding to information of pixels of an image) are transduced onto an optical carrier provided by a laser (e.g., an optical signal is generated). The input waveguide 108 can be split into N waveguides, where each waveguide is in optical communication with one of N optical signal modulators. Accordingly, the optical signal is split into N optical signals, where the N optical signal modulators are driven by the N optical signals. The N waveguides are in optical communication with the photonic processor 110. The N optical signals propagate through the photonic processor 110 and to the output port 122. The output port 122 can include M optical receivers 124.

The speed of the optical encoding operation performed by the optical encoder 104 can exceed 100 GHz. The overall speed of the photonic processing system 100 may be limited by the speed of the optical encoder 104 and/or the optical signal modulators 106 used to encode the input vector. For example, the overall speed may be limited by a maximum "chirping" frequency of a laser, wherein the chirping is produced by selectively applying power to and removing power from the laser.

As mentioned above, the optical encoder 104 is configured to encode an input vector into first optical signals. The first optical signals may comprise single-mode light and/or light including a predefined wavelength. For example, the predefined wavelength may be about 1550 nanometers.

The optical encoder 104 comprises N optical signal modulators 106, wherein N corresponds to the quantity of elements in the input vector, such as the quantity of pixels in a pixel block of an image to be processed. The optical encoder 104 may be configured to substantially simultaneously (i.e., parallelly) encode the input vector into the first optical signals by way of the optical signal modulators 106. In an example, the system 100 comprises first optical signal modulators and second optical signal modulators, wherein the first modulators transmit optical signals that correspond to a first input vector and the second modulators transmit optical signals that correspond to a second input vector. In such an embodiment, the system 100 is capable of parallelly processing multiple pixel blocks of the source image. The optical signal modulators 106 may be spaced at an interval of at least about twice the predefined wavelength, to minimize unintended interference between the optical signals generated by the optical signal modulators 106.

The waveguide 108 carries information in the optical domain of an element of the input vector. The waveguide 108 receives the first optical signal from the optical encoder 104 and/or the optical signal modulator 106. The processing system 100 may include N waveguides 108, wherein N corresponds to the quantity of elements in the input vector, such as the quantity of pixels in a pixel block of an image to be processed. In such an example, the waveguides 108 optically carry information corresponding to N pixels of a $\sqrt{N} \times \sqrt{N}$ pixel block of an image to be processed (i.e., a source image).

N may be any suitable number, such as about 1, 4, 16, 64, 256, 1024, 4096, etc. The source image may include any number of pixels, such as about 512×512 pixels (about 262,144 pixels), $10^{^{\wedge}}12$ pixels (i.e., terapixels), etc. The waveguides 108 may be spaced at an interval of at least about twice the predefined wavelength, to minimize evanescent coupling between the waveguides 108 if necessary. For example, in an embodiment wherein the predefined wavelength is about 1550 nanometers, a gap of about 3 micrometers, 3.45 micrometers (3450 nanometers), etc. may be included between the waveguides 108. In this example, the waveguide 108 may have a width of about 450 nanometers for single-mode operation (e.g., for supporting a single-mode of light passing through the waveguide 108). However, the waveguide 108 may be any width suitable for supporting single-mode light or multi-mode light propagating therethrough.

As mentioned above, the waveguide 108 is in optical communication with the photonic processor 110. A width of the photonic processor 110 is configured to accommodate the waveguides 108 spaced at an interval described above. The photonic processor 110 includes a scattering region 114 having scattering centers 116, where a refractive index of the scattering centers 116 is different than a refractive index of a material of the remainder of the scattering region 114. The refractive index of the scattering centers 116 may be about 1, and the refractive index of the material of the remainder of the scattering region 114 may be greater than 1. For example, the material of the remainder of the scattering region 114 may include a semiconductor material such as silicon, and the refractive index may accordingly correspond to that of silicon. Further, the scattering region 114 can include a silicon waveguide. Further, the photonic processor 110, spreading region 112, and/or the scattering region 114 may have an effective material index of about 2.8, about 2.83, etc.

The scattering centers 116 may occupy any portion of the scattering region 114 that yields a sufficiently random or pseudo-random scattering of optical signals incident to the scattering region 114 and/or minimizes scattering losses. For example, the scattering centers 116 may occupy less than about 50%, about 10%, about 3%, about 1%, etc. of a volume of the scattering region 114. In an embodiment, the scattering centers 116 occupy about 3% of a volume of the scattering region 114.

A spatial density of the scattering centers 116 may be substantially constant in a direction of the scattering region 114, such as a lengthwise direction, a direction parallel to the waveguide 108, a widthwise direction, a direction perpendicular to the waveguide 108, etc. Alternatively, spatial density of the scattering centers 116 may vary. Thus, the spatial density of the scattering centers 116 may be higher or lower near one end of the scattering region 114 relative to another end of the scattering region 114. Such spatial intensity gradients may be advantageous for scattering light with a sufficient degree of randomness, minimizing scattering losses, and/or reducing a dimension (e.g., a physical size) of the photonics processing system 100.

The scattering centers 116 can be cylindrical voids extending through a thickness of the photonic processor 110. In another example, the scattering centers 116 have a cross-section corresponding to another shape, such as a square, triangle, oval, rhombus, star, etc. The scattering centers 116 may be substantially straight-walled (i.e., having a substantially constant horizontal cross-section along a height of the scattering center). Alternatively, the scattering centers 116 may have convex walls, concave walls, or walls otherwise having non-constant horizontal cross-sections along the height of the scattering center. Pursuant to an example, the scattering region 114 comprises randomly-positioned air cylinders as the scattering centers 116. The scattering centers 116 may be fabricated by etching air holes in the silicon waveguide of the scattering region 114. A thickness of the photonic processor and/or a height of the scattering centers 116 may be about 250 nanometers. A dimension, such as a radius, of the scattering centers 116 may be about 50 nanometers.

The system 100 may be linear, such that the transmitted output O (e.g., the second optical signals output by the photonic processor 110) can be expressed as a product of the encoding matrix T (e.g., the quasi-random matrix) and the input I (e.g., the first optical signals received by the photonic processor 110). The relationship can be expressed as $O=TI$, where the encoding of the first optical signals (I) is determined by the quasi-random matrix (T) to form the second optical signals (O). The input I can be an N×1 vector. The output O can be an M×1 vector. The encoding matrix T can be an M×N matrix. In embodiments where M<N, the system 100 can perform a single matrix multiplication to compress an N pixel block of an original image into M output pixels. Since the quasi-random encoding layer is passive, this compression process can be extremely fast, operating on N pixels in parallel at speeds that may be limited only by capabilities of the modulators and optical receivers (e.g., photodetectors). Furthermore, energy consumption associated with active components of the compression process scales linearly with N (i.e., the number of modulators), even though the device performs M×N operations.

As discussed earlier, since it was discovered that some neural encoding systems are not sensitive to details of the feature map implemented by the first few layers of a neural encoding system and can therefore have arbitrary connections and weights, this property is utilized by designing the photonic processor 110 to implement the quasi-random matrix. The quasi-random matrix is achieved by positioning the scattering centers 116 substantially randomly in the scattering region 114 such that light injected to the waveguide 108 will undergo random multiple scattering events upon being incident with and/or propagating through the scattering region 114.

The spreading region 112 of the photonics processor 110 is configured to spread the first optical signals into third optical signals, and the scattering region 114 is configured to scatter the third optical signals into the second optical signals. For instance, the spreading region 112 is or includes a multimode silicon waveguide. The spreading region 112 may support a larger number of modes than the waveguide 108, therefore light exiting the waveguide 108 may spread laterally (e.g., in a direction having a component perpendicular to a transmission direction of the waveguide 108) in the spreading region 112. Hence, the spreading region 112 can modify a wavefront incident to the scattering region 114 to be a speckle-like wavefront with substantially random amplitudes and phases. It is to be understood that photonic processor 110 may include the spreading region 112 and omit the scattering region 114. In this setup, the spreading region 112 is configured to spread the first optical signals into the second optical signals.

The first optical signals may comprise single-mode light, and the third optical signals may comprise multimodal light. In an example, the third optical signals form a speckle pattern. The speckle pattern may be a time-domain speckle pattern. For example, multiple reflections (e.g., reflections resulting from light incident with the spreading region 112 and/or the scattering region 114) of a coherent pulse generated at different instants (e.g., the first optical signals generated by the optical encoder 104) interfere to produce a time-domain signal (e.g., the third optical signals and/or the second optical signals) that is pseudo-random or quasi-random.

The speckle pattern may be a spatial speckle pattern. For instance, the speckle pattern may be incident substantially across a width of an end 118 of the scattering region 114. When compared to a waveguide 108 connected directly to the scattering region 114, addition of a spreading region 112 allows input light (i.e., light generated by the optical signal modulator 106) to be incident across the entire width of the scattering region 114, which helps in randomizing the elements of the encoding matrix (i.e., the quasi-random matrix) without increasing the length of the scattering region 114 and introducing additional scattering losses. The randomness of the encoding matrix may be analyzed by comparing magnitudes of diagonal elements with magnitudes of off-diagonal elements of the encoding matrix. In a sufficiently random encoding matrix (i.e., quasi-random matrix), the diagonal and off-diagonal elements may have similar magnitudes. A sufficiently random encoding matrix may comprise substantially uniformly distributed off-diagonal and diagonal elements of substantially similar magnitudes.

The width of the end 118 of the scattering region may correspond to a portion of the scattering region 114 that is occupied by the scattering centers 116, enclosed by the photonic crystal 120, aligned with any of the elements in the photonic processing system, etc. The end 118 of the scattering region 114 that the speckle pattern is incident therewith may be an input side of the scattering region 114. For example, the end 118 of the scattering region 114 may be an end of the scattering region 114 that interfaces with the spreading region 112 and/or receives the third optical signals formed by the spreading region 112. In an example, the end 118 of the scattering region 114 is an end of the scattering region that is most proximal to the optical encoder 104 and/or is most distal to the optical receiver 124.

The speckle pattern (i.e., speckle, speckle noise) may be a granular noise texture that is conventionally considered to degrade the quality of a signal as a consequence of interference among wavefronts in coherent imaging systems. However, transmitting optical signals through the spreading region 112 before being scattered by the scattering region 114 enables the scattering region 114 to be of a shorter length than what would be required without the spreading region 112. Such a shorter length of the scattering region 114 can be achieved while ensuring sufficient randomness of the quasi-random matrix that corresponds to the scattering region 114 and/or minimizing out-of-plane scattering losses. In embodiments, the scattering region 114 may scatter incident light in-plane and out-of-plane. Out-of-plane scattering losses reduce energy efficiency of the processing system 100. Such losses may be mitigated by including the spreading region 112 ahead of the scattering region 114.

When the photonic processor 110 does not include a spreading region 112, a length of the scattering region 114 can be about ten times a mean free path of light in the scattering region 114 in order to yield a sufficiently random quasi-random matrix. In an example, the mean free path of light is a scattering mean free path, wherein the scattering mean free path is the average distance a particle of light travels before substantially changing its direction and/or energy. In another example, the mean free path of light may be a transport mean free path of light in the scattering region 114.

The transport mean free path may be the average distance a particle of light travels before it changes its direction to be in a substantially opposite general direction. For example, the transport mean free path may be the average distance a particle of light travels from an input side of the scattering region 114 toward an output side of the scattering region 114 before the particle of light changes its direction to no longer be heading generally toward the output side of the scattering region 114 (e.g., the particle of light reverses course and begins to generally head back toward the input side of the scattering region 114).

In contrast to the previous example where the photonic processor 110 does not include the spreading region 112, in another example the photonic processor 110 includes the spreading region 112, wherein the spreading region 112 is in optical communication with the optical encoder 104 and with the scattering region 114 of the photonic processor (e.g., the spreading region 112 is positioned between the optical encoder 104 and the scattering region 114). Such a configuration enables the scattering region 114 to have a length of less than about ten times a mean free path of light in the scattering region 114, while ensuring that the quasi-random matrix remains sufficiently random. The scattering region 114 may have a length corresponding to any multiple of the mean free path of light in the scattering region 114, such as about one times the mean free path, about twice the mean free path, about five times the mean free path, etc.

The spreading region 112 may have a width of about 55.2 micrometers and/or a length of or between about 120 micrometers and about 150 micrometers, etc. The scattering region 114 may have a width of about 55.2 micrometers and/or a length of about 30 micrometers. However, any suitable dimensions may be used for the spreading region 112 and the scattering region 114. The width for the spreading region 112 and the scattering region 114 can be similar to a sum of the width of all the N waveguides 108, the sum optionally including any spacing between the waveguides 108. The spreading region 112 and the scattering region 114 may be configured such that at least about 5% or more of the light generated by the optical encoder 104 is transmitted to the output port 122. Furthermore, the spreading region 112 and the scattering region 114 can be configured such that at least about 1%, 10%, 15%, 20%, etc. of the light generated by the optical encoder 104 is transmitted to the output port 122.

The photonic crystal 120 may be disposed along at least a portion of a side, an end, an edge, a face, etc. of the photonic processor 110, spreading region 112, and/or scattering region 114. The photonic crystal 120 can be disposed along a side of the photonic processor 110, wherein the side is perpendicular to an input side of the photonic processor 110 receiving optical signals and/or is perpendicular to an output side of the photonic processor 110 outputting optical signals. In another example, the photonic crystal 120 is disposed between a first plane coplanar with the end 118 of the scattering region 114 and a second plane coplanar with a second end of the scattering region, wherein the second end is opposite the end 118 and/or adjacent to the output port 122. The photonic crystal 120 may be disposed on a non-propagation side of the photonic processor 110. Further, the photonic crystal 120 may be configured to minimize leakage of light through the non-propagation side of the photonic processor 110. The photonic crystal 120 can support a band gap at approximately equal to the predefined wavelength. Additionally, the photonic crystal 120 can be configured to block propagation of light generated by the optical encoder 104 from propagating through the non-propagation side of the photonic processor 110. For instance, the photonic crystal 120 supports a band gap at about 1550 nanometers.

As mentioned above, the photonic processor 110 may be in optical communication with the output port 122. Contrast of the speckle pattern mentioned above is a factor in determining signal-to-noise ratio (SNR) of optical signals measurable in the output port 122. The contrast of the speckle pattern is inversely proportional to the square root of the number of spatial modes that is supported at the output port 122. As will be described in greater detail herein, the processing system 100 may utilize local transformations of pixel blocks comprising a source image as opposed to global transformations of the source image. Since local transforms require fewer optical signal modulators 106 and/or waveguides 108, the width of the photonic processor 110 and/or the scattering region 114 may be reduced. This allows a width (W$_{output}$) of the output port 122 to be reduced. In turn, this reduces the number of modes supported by a waveguide at the output port 122, as the number of modes supported at the output port 122 is approximately given by W$_{output}$/(Δ/(2*n_e)), wherein X is the incident wavelength and ne is the refractive index of the medium. Thus, local transformations when compared to global transforms, allow for better signal-to-noise ratios (SNR) of optical signals (e.g., the second optical signals) in the output port 122.

The output port 122 may include the optical receiver 124. The output port 122 may include M optical receivers 124, wherein the optical receivers 124 correspond to M non-overlapping spatial regions of the output port 122. The portion of the second optical signals detectable by the optical receiver 124 may correspond to one of the spatial regions. The M non-overlapping spatial regions and/or the M optical receivers 124 may correspond to the quantity of elements in the output vector (i.e., the size of the output vector). Optical signals from the optical encoder 104 may be scattered to form a temporal intensity pattern and/or a spatial intensity pattern in or incident to the output port 122. In an example, the temporal intensity pattern is binned into M time slices (i.e., sampling windows). In another example, the spatial intensity pattern is binned into the M non-overlapping spatial regions of the output port 122.

When the processing system 100 is configured to compress an input vector into an output vector (e.g., compress a source image into a decompressed image), M is less than N, where N corresponds to the number of optical signal modulators 106 and/or the quantity of elements in the input vector and/or the size of the quasi-random matrix. A ratio of the quantity of optical signal modulators (i.e., N) to the quantity of optical receivers (i.e., M) corresponds to a compression ratio. In embodiments, the compression ratio may be any ratio, such as 1:1, 2:1, 4:1, 8:1, 16:1, etc. When the system 100 is configured for data encryption, M may be larger than, smaller than, or equal to N. In such embodiments, the compression ratio may be equal to or less than 1.

The optical receiver 124 can be configured to detect at least a portion of the second optical signals. The optical receiver 124 can include an amplitude sensitive detector. The optical receiver 124 can include a phase sensitive detector. The optical receiver 124 is configured to output an electrical representation of the output vector, where the electrical representation may be digital or analog.

Figure 2:
FIG. 2 is a diagram of a photonic processing system.

Referring to FIG. 2, a data processing system 200 is illustrated. The data processing system 200 is configured to encode an input vector and optically process the input vector into a processed vector. The data processing system 200 may optionally be further configured to transmit the processed vector to an electronic processor and electronically process (e.g., decode, decompress, etc.) the processed vector into a reconstructed vector. The electronic processor may use a neural network, such as a convolutional neural network, to electronically process the output vector into the reconstructed vector.

The system 200 includes an input vector 202, the photonic processing system 100, a processed vector 216, a transmitter 204, an electronic processor 206, and a reconstructed vector 208. The photonic processing system 100 can include the optical encoder 104, the photonic processor 110, and the output port 122.

The input vector 202 includes N elements which may represent information corresponding to pixels of a pixel block of a source image to be processed by the system 200 (i.e., the input vector 202 corresponds to the source image). The photonic processing system 100 is configured to perform analog photonic processing of the input vector 202 to generate the processed vector 216. The optical encoder 104 is configured to encode the input vector 202 into N first optical signals. The photonic processor 110 is configured to mix, spread, scatter, or a combination thereof the first optical signals into second optical signals, wherein the second optical signals correspond to the processed vector 216. The processed vector 216 includes M elements which may represent information corresponding to pixels of a pixel block of a processed image (e.g., the processed vector 216 corresponds to a compressed image generated by the photonic processing system 100). The output port 122 is configured to detect at least a portion of the second optical signals and output a transmittable representation (e.g., an electrical representation) of the processed vector 216. The system 200 may further include the transmitter 204 for transmitting the transmittable representation of the output vector 216 to the electronic processor 206. The system 200 can include the electronic processor 206. The electronic processor 206 can decode, decompress, and/or otherwise process the processed vector 216 to generate the reconstructed vector 208. The electronic processor 206 may use digital electronic processing and/or neural network processing methods. The reconstructed vector 208 represents information corresponding to pixels of a pixel block of a reconstructed image (i.e., the reconstructed vector 208 corresponds to the reconstructed image generated by the data processing system 200).

Referring now to FIGS. 3-6, methods pertaining to photonics processing are presented. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Figures 3, 4:
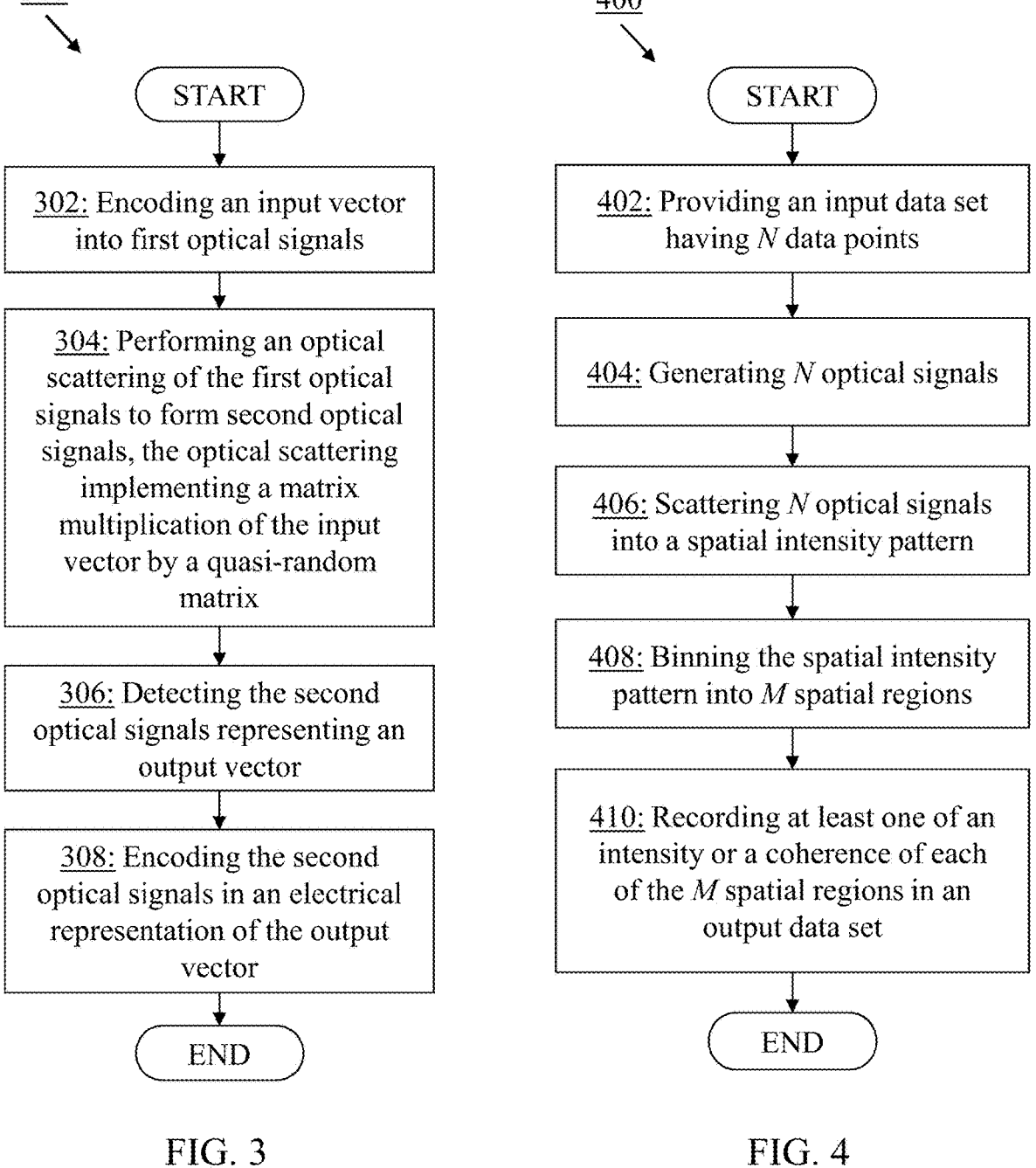

Referring now solely to FIG. 3, a photonic processing method 300 is shown. At 302, an input vector is encoded into first optical signals. At 304, an optical scattering of the first optical signals is performed to form second optical signals, the optical scattering implementing a matrix multiplication of the input vector by a quasi-random matrix. At 306, the second optical signals representing an output vector are detected. At 308, the second optical signals are encoded in an electrical representation of the output vector 308.

Now turning to FIG. 4, a photonic processing method 400 is shown. At 402, an input data set having N data points is presented. At 404, N optical signals are generated. At 406, the N optical signals are scattered into a spatial intensity pattern. At 408, the spatial intensity pattern is binned into M spatial regions. At 410, at least one of an intensity or a coherence of each of the M spatial regions is recorded in an output data set.

With reference to FIG. 5, a photonic processing method 500 is depicted. At 502, pixels of an image are parallelly and optically encoded into first optical signals. At 504, the first optical signs are parallelly and optically compressed into second optical signals. At 506, the second optical signals are decoded into pixels of a reconstructed image. At 508, pixels of the reconstructed image are optionally conditioned.

Referring to FIG. 6, another photonic processing method 600 is illustrated. At 602, an input image is provided. At 604, an input pixel block having N pixels is provided. At 606, N optical signals are modulated. At 608, N optical signals are spread into a speckle pattern. At 610, the speckle pattern is scattered into a spatial intensity pattern. At 612, the spatial intensity pattern is binned into M spatial regions. At 614, an intensity of at least one of the M spatial regions is detected.

In an exemplary embodiment of a photonic processing method, the method includes implementing a matrix multiplication of a vector by a quasi-random matrix. The matrix multiplication may be a convolution process comprising adding each element of the vector to its local neighboring elements, weighted by the kernel (i.e., the quasi-random matrix). For example, each element is a pixel value, and the vector represents a pixel block of a source image.

Figure 7A:
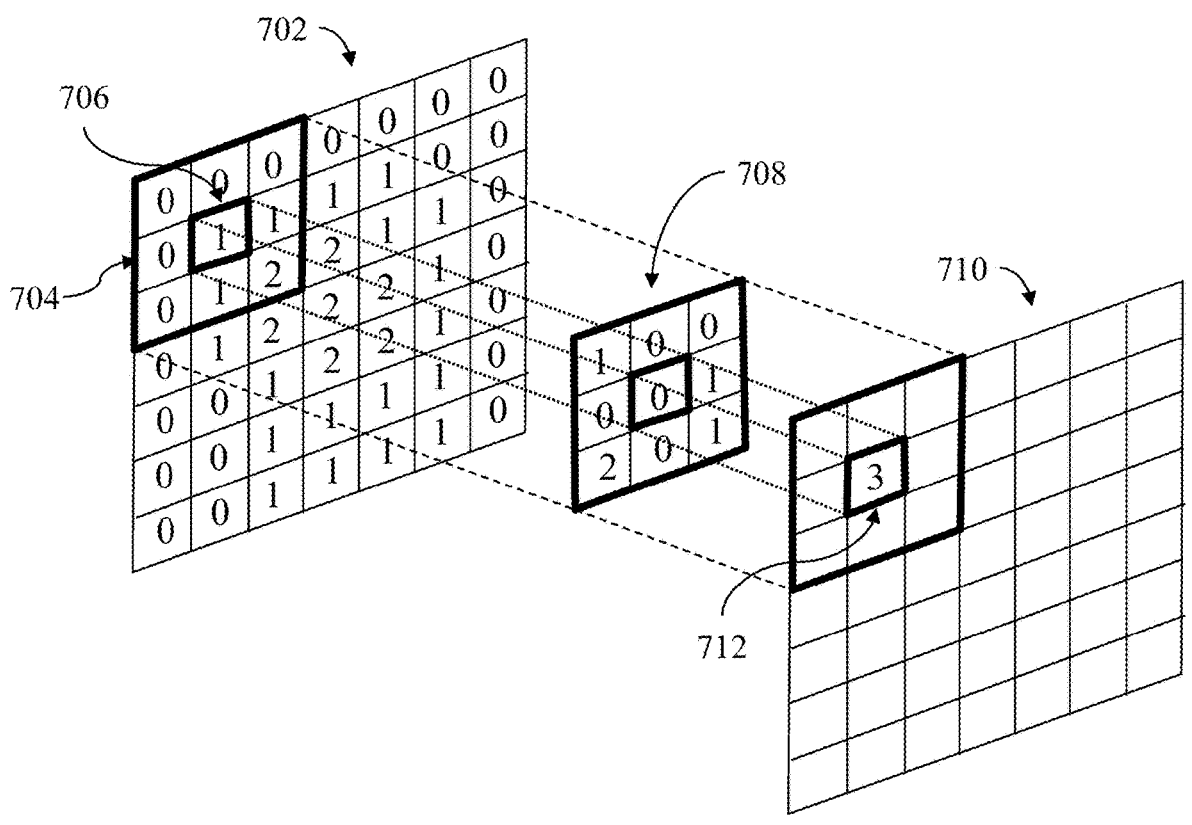
FIGS. 7A and 7B are diagrams showing a matrix multiplication of an input vector by a quasi-random matrix.
Figure 7B:
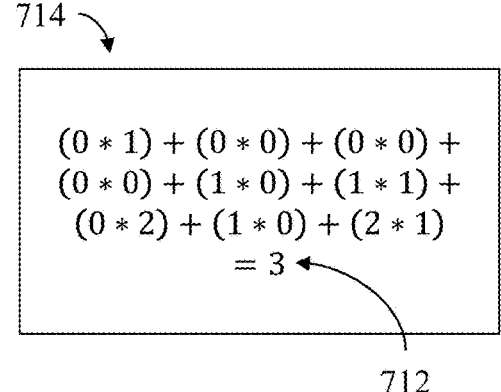

An example of the convolution process is shown in FIGS. 7A and 7B. A source image 702 includes a $\sqrt{N} \times \sqrt{N}$ pixel block 704 including a source pixel 706. The pixel block 704 is convolved (i.e., subjected to the convolution process) by a quasi-random matrix 708 (i.e., the kernel). The convolution process yields a compressed image 710 including a compressed pixel value 712 that may correspond to the pixel block 704. The compressed pixel value 712 may be generated by matrix multiplication 714, as shown in FIG. 7B.

Figure 8A:
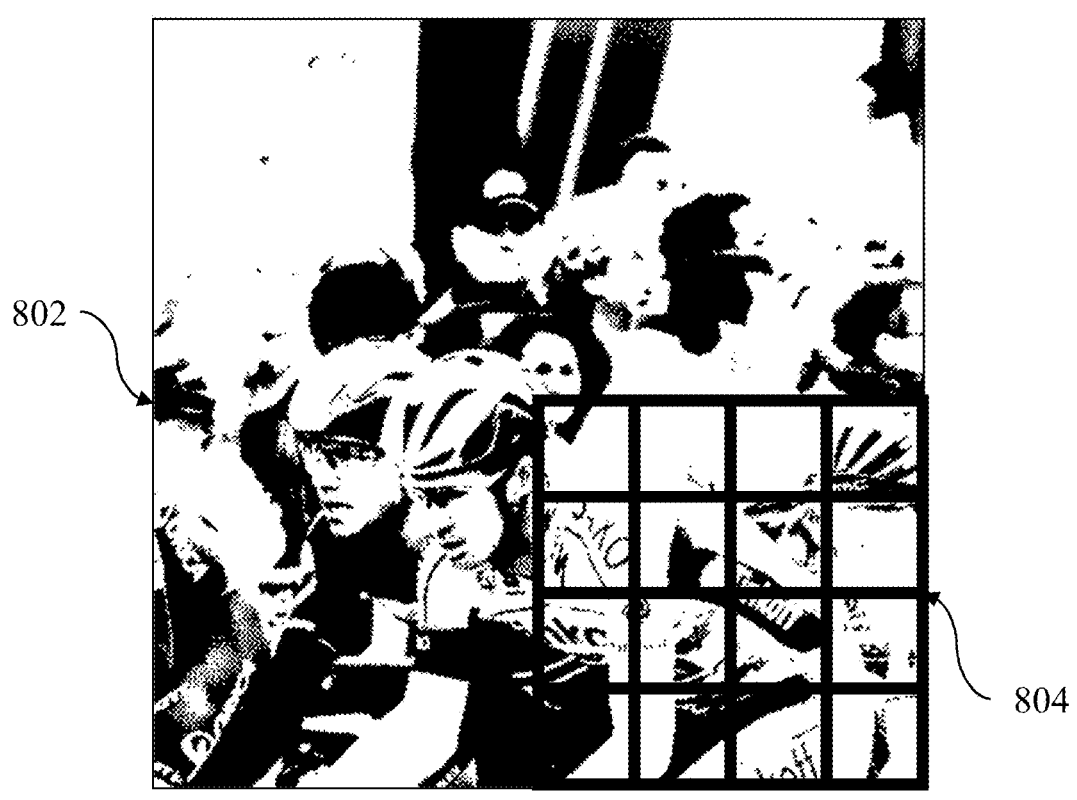
FIGS. 8A and 8B are diagrams showing a source image and a reconstructed image.
Figure 8B:

An example of a source image is shown in FIG. 8A, and an example of a reconstructed image is shown in FIG. 8B. A source image 802 includes a pixel block 804. For example, the pixel block 804 is a 4×4-pixel block having 16 pixels. The pixel block 804 may correspond to an input vector. A reconstructed image 806 includes a reconstructed pixel block 808. For instance, the reconstructed pixel block is a 2×2 pixel block having 4 pixels. In such an embodiment, a compression ratio may be 16 pixels to 4 pixels (i.e., 4:1).

A kernel size (e.g., a size of an input vector, pixel block, transformation matrix, quasi-random matrix, etc.) may affect the quality and/or speed of image processing, such as image compression, as illustrated in FIGS. 9A-9E. For example, a smaller kernel size (N) reduces data throughput (e.g., processing speed) since the system 100 is limited to parallelly processing a lower amount of N pixels. However, smaller kernel sizes can maintain spatial structure of the source image, which can lead to improved image reconstruction. Further, smaller kernel sizes can be used to compress arbitrarily large images without requiring a corresponding increase in quantities of modulators and optical receivers (e.g., photodetectors). Furthermore, smaller kernel sizes can isolate noise from a given pixel (e.g., a hot pixel), thereby preventing the noise from affecting a larger portion of the compressed image. Furthermore, since the system 100 can effectively map input pixel blocks to speckle patterns, using a large kernel size could lead to low contrast speckle, which can degrade image reconstruction.

Figure 9A:
FIG. 9A is a diagram showing a source image.
Figure 9B:
FIGS. 9B and 9C are a compressed image and a reconstructed image, respectively, using a first pixel block size in a photonic processing method.
Figure 9D:
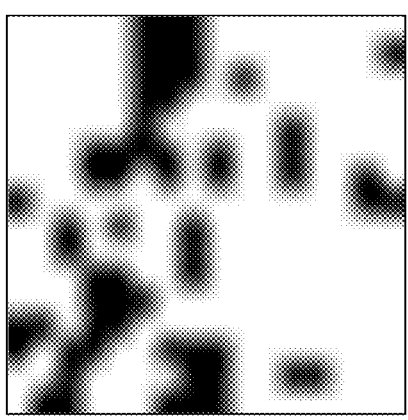
FIGS. 9D and 9E are a compressed image and a reconstructed image, respectively, using a second pixel block size.
Figure 9C:
Figure 9E:

FIG. 9A shows a source image having a source image size of 512×512 pixels. FIG. 9B shows a first compressed image, wherein the first compressed image is generated by convolving the source image with an 8×8-pixel kernel (i.e., a kernel size of 64 pixels). FIG. 9C shows a first reconstructed image, wherein the first compressed image has been decompressed, decoded, and/or deconvolved to generate the first reconstructed image. FIG. 9D shows a second compressed image, wherein the second compressed image is generated by convolving the source image with a 32×32-pixel kernel (i.e., a kernel size of 1,024 pixels). FIG. 9E shows a second reconstructed image, wherein the second compressed image has been decompressed, decoded, and/or deconvolved to generate the second reconstructed image. For both cases (i.e., FIGS. 9B-9C and FIGS. 9D-9E), the compression ratio (N:M) is fixed to be 8:1. When comparing FIG. 9C and FIG. 9E, it can be seen that the 8×8-pixel kernel yielded a reconstructed image more similar to the source image than that produced by the 32×32-pixel kernel. More specifically, the 8×8-pixel kernel yielded a reconstructed image with a higher peak signal-to-noise ratio (PSNR) and a higher structural similarity index measure (SSIM) than the 32×32-pixel kernel.

As demonstrated above, for a given compression ratio, a smaller kernel size, as opposed to a larger kernel size or even a global transformation, may better retain spatial structure of the source image in the compressed image, which results in a higher fidelity reconstructed image. However, if faster processing speed is prioritized, kernel size may be increased. Selecting the kernel size depends on the size of the source image and the desired output quality (e.g., PSNR, SSIM, etc.) and/or processing time.

In addition to kernel size, two types of quasi-random kernels (i.e., quasi-random matrices) were investigated. In an example, the quasi-random matrix is real. In such an example, the real quasi-random matrix may include only positive numbers and zeros. Further, the real quasi-random matrix can include numbers distributed (e.g., substantially uniformly distributed) between 0 and 1, inclusively. The real quasi-random matrix may be representative of a compression process wherein light coupled to each of the input waveguides 108 is incoherent. For example, a frequency comb or other multi-wavelength source could be used to couple light at different wavelengths into each input waveguide 108. For example, differing wavelengths input to the waveguides 108 should be separated in frequency by at least about 10 times a bandwidth of the optical receiver 124 (e.g., photodetector) to minimize interference effects. The speckle patterns formed by light from each waveguide 108 would sum incoherently on the optical receivers 124. Accordingly, a compression process performed by the photonic processing system 100 can be modeled using a quasi-random matrix T that is real-valued and non-negative.

In another example, the quasi-random matrix is complex. In such an example, the complex quasi-random matrix may include positive numbers, negative numbers, and zero. In embodiments, the real quasi-random matrix corresponds to a measured intensity encoding matrix (e.g., intensity values of optical signals detected by the optical receiver 124). In embodiments, the complex quasi-random matrix corresponds to a coherent field encoding matrix (e.g., phase values of optical signals detected by the optical receiver 124). Depending on how the information is injected to the scattering region 114 (e.g., by varying intensity, frequency, and/or phase of the optical signals generated by the optical encoder 104), the real quasi-random matrix or the complex quasi-random matrix may selectively be employed for encoding and compressing the source image data. For example, if all the N input waveguides 108 are substantially coherent with respect to one another (i.e., have same optical path lengths and wavelength) and the pixel information is injected simultaneously, the coherent field encoding matrix may be employed for encoding. In another example, if wavelength division multiplexing techniques are utilized (e.g., by integrating frequency combs as light sources) and N different wavelengths are used for encoding the input information, the intensity encoding matrix may be used for encoding the image data. The intensity encoding matrix may also be used for encoding if, instead of simultaneous injection of the input light, the inputs are injected serially into the N input waveguides 108 and averaged over a time slice or a sampling window. Thus, a compression process performed by the photonic processing system 100 can be modeled using a complex-valued quasi-random matrix T, where each element in T comprises an amplitude and/or a phase. In this example, a compressed image can be obtained as the square-law response of the optical receiver(s) 124, which may be represented by $O=(T\sqrt{I})(\overline{T\sqrt{I}})$. The complex-valued quasi-random matrix may be representative of coupling a single coherent laser to all the input waveguides 108 at once such that the measured speckle pattern is formed by interference between light from each waveguide 108.

For compression of source images with little to no noise, both real and complex transforms can be equally efficient in terms of encoding and compressing the image data. In real-world applications, however, images are generally not noiseless. For example, noise can come from multiple sources ranging from the light source (e.g., optical signal modulator 106) to the detector (e.g., optical receiver 124). Noise can be introduced during an original image formation process (e.g., due to low-light levels or imperfections in the imaging optics), through the camera optoelectronic conversion process (e.g., due to pixel non-linearity or limited bit depth of camera pixels), or through an optical compression process performed by the photonic processing system (e.g., due to laser intensity noise, environmental variations in the T matrix, or shot noise at a detection stage of the process). In embodiments, as the source image increases in noisiness, complex transforms (i.e., quasi-random matrices including positive and negative numbers) lead to lower reconstruction errors compared to real transforms for the same reconstruction algorithm, kernel size, and neural architecture. Therefore, while real and positive transforms can be utilized for encoding and compressing images with low noise levels, measurements involving higher noise levels may achieve improved reconstruction results when utilizing complex transforms as opposed to real transforms. This is because the contrast of the compressed images is higher for complex transforms. In an embodiment wherein real transforms are utilized to encode a noisy image; the kernel size may be minimized to improve the reconstruction quality. The photonic processing systems described herein are relatively resilient to noise. Accordingly, these systems can forego energy-intensive image conditioning by encoding raw source image data and rely on a back-end neural network to perform any necessary compensation for noise caused, for example, by pixel non-uniformity in the source image.

Figure 10:
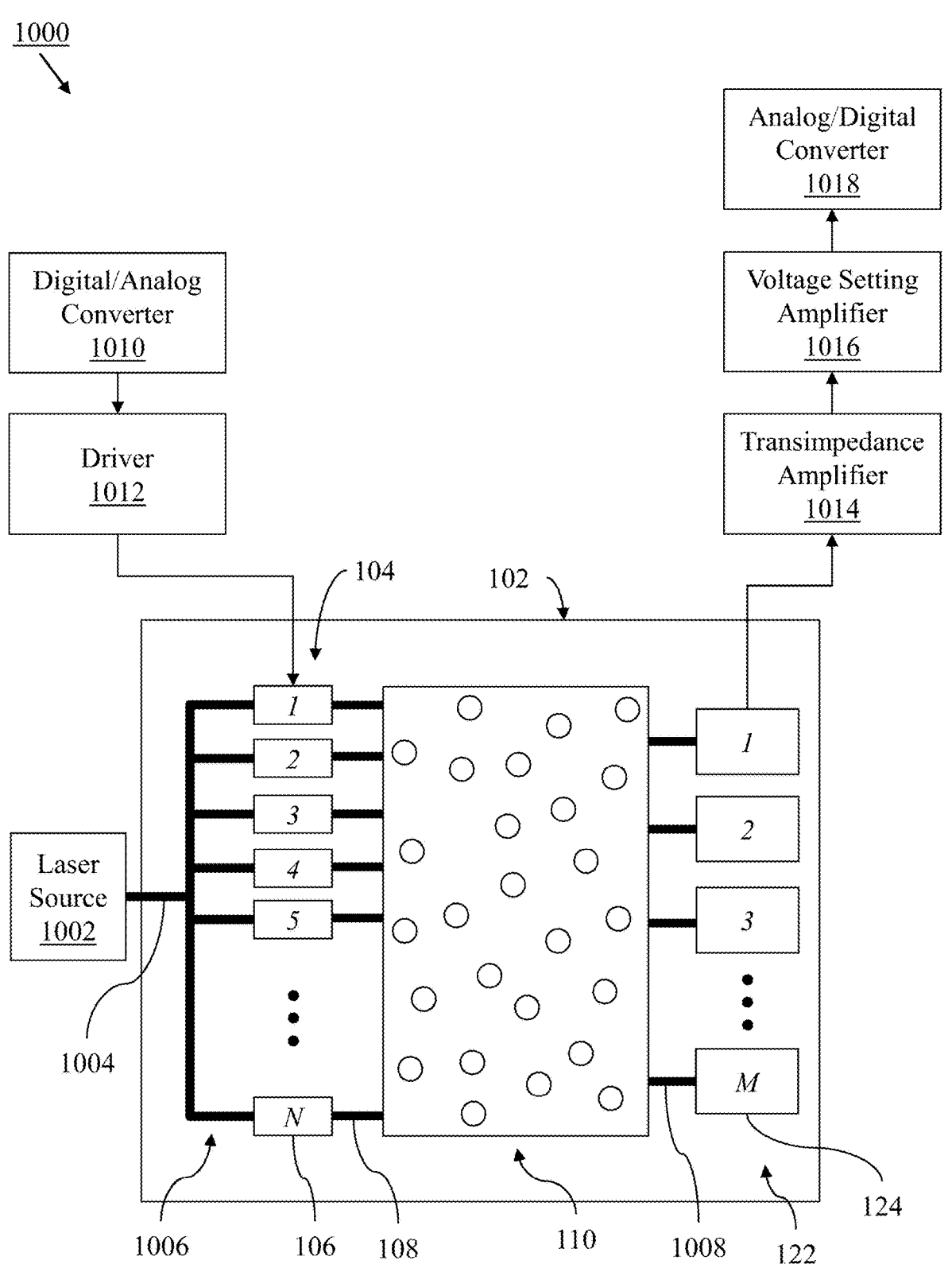
FIG. 10 is a diagram of a photonic processing system.

With reference now to FIG. 10, a photonic processing system 1000 is shown. The photonic processing system 1000 includes photonic components comprising a laser source 1002, an optical encoder 104 including N optical signal modulators 106, a photonic processor 110, and an output port 122 having M optical receivers 124. The system 1000 can include passive silicon photonic components, such as the photonic processor 110. Further, the photonic (e.g., optical) processing performed by the photonic components as described herein can be performed in conjunction with (e.g., in series with, in parallel with, etc.) electronic processing, for example, by electronic components. The photonic processing system 1000 can include electronic components (e.g., active CMOS IC components) comprising a digital/analog converter (DAC) 1010, a driver 1012, a transimpedance amplifier (TIA) 1014, a voltage setting amplifier 1016, an analog/digital converter (ADC) 1018, or any combination thereof. Furthermore, the system 1000 can include active optoelectronic components, which may be the modulators 106 or the receivers 124. Including the modulators 106 and the receivers 124 enables the system 1000 to extract amplitude information and phase information of encoded electric fields for different inputs (e.g., extract amplitude information and phase information corresponding to each of N input analog signals from M output optical signals) using phase retrieval compressive measurement techniques. Accordingly, the system 1000 can encode an input vector using a complex-valued encoding matrix (e.g., a quasi-random matrix which may include positive numbers, negative numbers, and zero).

The laser source 1002 is in optical communication with the optical encoder 104, for example, by way of waveguides 1004, 1006. The laser source 1002 is in optical communication with a first waveguide 1004. The first waveguide 1004 is split into N second wave guides 1006 in optical communication with N optical signal modulators 106 of the optical encoder 104. In this embodiment, a single laser source 1002 can be used to generate an optical carrier (e.g., a laser pulse) that is split and provided to the N optical signal modulators. For example, the laser source 1002 can provide light to the second wave guides 1006 such that an amplitude of light received by each of the second wave guides 1006 is approximately equal. Accordingly, each of the N optical signal modulators 106 can receive approximately equal amplitude light from the laser source 1002. Furthermore, in an embodiment where the laser source 1002 is a single coherent laser in optical communication with the input waveguides 108, a speckle pattern (e.g., at an interface between a spreading region and a scattering region of the photonic processor 110) is formed by interference between light from each input waveguide 108.

The N optical signal modulators 106 of the optical encoder 104 are in optical communication with N input waveguides 108 which are in optical communication with the photonic processor 110. In other words, the optical encoder 104 is in optical communication with the photonic processor 110. The photonic processor 110 is in optical communication with M output waveguides 1008 of the output port 122. The M output waveguides 1008 are in optical communication with M optical receivers 124 of the output port 122. In other words, the photonic processor 110 is in optical communication with the M optical receivers 124. While FIG. 10 shows the laser source 1002 disposed separately from the substrate 102, the laser source 1002 may be disposed on, within, or adjacent to the substrate 102.

The DAC 1010 is in electrical communication with the driver 1012. The driver 1012 is in electrical with the optical encoder 104. The driver 1012 can be in electrical communication with each of the N optical signal modulators 106. The system 1000 can include N drivers 1012 in electrical communication with the N optical signal modulators 106. Further, the system 1000 can include N DACs 1010 in electrical communication with the N drivers 1012. The output port 122 is in electrical communication with at least one of the TIA 1014, the voltage setting amplifier 1016, the ADC 1018, or a combination thereof. The M optical receivers 124 can be in electrical communication with the TIA 1014. For example, the M optical receivers 124 can be in electrical communication with M TIAs 1014. The TIA 1014 can be in electrical communication with the voltage setting amplifier 1016. For example, the M TIAs can be in electrical communication with M voltage setting amplifiers 1016. The voltage setting amplifier can be in electrical communication with the ADC 1018. For example, M voltage setting amplifiers can be in electrical communication with M ADCs 1018. While FIG. 10 shows the DAC 1010, the driver 1012, the TIA 1014, the voltage setting amplifier 1016, and the ADC 1018 disposed separately from the substrate 102, the DAC 1010, the driver 1012, the TIA 1014, the voltage setting amplifier 1016, the ADC 1018, or a combination thereof may be disposed on, within, or adjacent to the substrate 102.

The DAC 1010 can convert an input digital signal corresponding to information of pixels of an image to an input analog signal corresponding to the information. The DAC 1010 can provide the input analog signal to the driver 1012. Based on the input analog signal, the driver 1012 can drive the N optical signal modulators 106. For example, the driver 1012 can set output voltage levels for the optical signal modulator(s) 106. The N optical signal modulators can transduce the optical carrier provided by the laser source 1002 to generate N optical signals corresponding to the input analog signal. In other words, digital data corresponding to the image are converted to the optical domain in the form of N optical signals. The N optical signals are provided to the photonic processor 110, for example, by way of the waveguides 108. Light corresponding to the N optical signals propagates through the photonic processor 110 and is received by the M optical receivers 124. Accordingly, the photonic processor 110 can convert N input optical signals to M output optical signals. As described herein, a ratio of N inputs to M outputs can be configured based on the type of processing task(s) to be performed by the system 1000.

The optical receiver 124 can output electrical current signal(s) (i.e., an output analog signal) corresponding to the M output signals. For example, the output current signal can represent amplitude(s), phase(s), or a combination thereof corresponding to the M output signals. The optical receiver 124 can provide the output current signal to the TIA 1014. The TIA 1014 can convert the output current signal to a voltage or a voltage signal. The TIA 1014 can provide the voltage or voltage signal to the voltage setting amplifier 1016. The voltage setting amplifier 1016 can vary, adjust, amplify, etc. the voltage or voltage signal to a second voltage or second voltage signal. For example, the second voltage may correspond to a voltage level of a CMOS family (e.g., a group of CMOS IC components). The voltage setting amplifier 1016 can provide the second voltage or second voltage signal to the ADC 1018. The ADC can convert the second voltage or second voltage signal to an output digital signal. Accordingly, the electronic components of the system 1000 can convert information corresponding to pixels of an image to an input analog signal such that N input optical signals may be generated based on and corresponding to the information of the pixels. Furthermore, the electronic components of the system 1000 are configured to convert M output optical signals into an output digital signal, for example, such that the image may be reconstructed using digital electronics.

As described above, the photonic processing systems and associated methods include a matrix multiplication operation. Therefore, the energy efficiency of the system can be calculated and compared to a conventional electronic approach by calculating the energy required for a multiply-accumulate (MAC) operation. Conventional electronic approaches have an energy consumption efficiency of about 1 picojoule per MAC operation.

In an embodiment, the power consumption of the system 100 has two components. The first component is an electrical power component which corresponds to the energy consumed by a laser, optical signal modulators, and optical receivers when encoding the input vector into first optical signals and measuring the encoded outputs (e.g., the second optical signals). The second component corresponds to optical power associated with the insertion losses of the optical signal modulator, loss due to backscattering and out-of-plane scattering of light in the scattering region, and wall-plug efficiency of the source of the optical signal (e.g., a laser source). Both of the components are calculated below to determine the energy efficiency of an embodiment of the photonic processing system 100.

Firstly, electrical power consumption will be addressed. To estimate required laser power, a detected optical signal power ($P_{Rx}$) required to provide a sufficient signal-to-noise ratio (SNR) for accurate image compression is estimated. Assuming shot-noise limited detection, the required optical signal power reaching each optical receiver can be expressed by Equation 1, wherein ENOB is the required effective number of bits, q is the charge of a single electron ($1.6*10^{-19}$ coulombs), $f_0$ is the operating frequency of the modulator (and the optical receiver baud rate), and $\mathcal{R}$ is responsivity of the optical receiver in units of A/W.

$$P_{Rx} = 2^{2ENOB} q f_0 / \mathcal{R} \tag{1}$$

The ENOB can be related to the measurement SNR in dB as SNR=6.02×ENOB+1.72. In the energy consumption calculations below, it is assumed an ENOB equal to 6 is required, which corresponds to a measurement SNR of 38 dB. Based on the required $P_{Rx}$, the required laser power ($P_{laser}$) can be calculated by Equation 2, wherein N is the number of pixels in a pixel block of a source image, $T_{mod}$ is transmission through the modulators, and $T_{scatter}$ is transmission through the scattering region.

$$P_{laser} = \frac{N \times P_{Rx}}{T_{mod} T_{scatter}} \tag{2}$$

The electrical power required to drive the laser can then be written as $P_{laser}/\eta$, where $\eta$ is the wall-plug efficiency of the laser. The factor of N in Equation 2 implies that the spreading region and scattering region support N spatial modes, which may be a minimum number of spatial modes required to efficiently couple light from N single-mode input waveguides. Further, Equation 2 implies that each optical receiver may collect, on average, about 1/N of the light transmitted through the scattering region. It is contemplated that adiabatically coupling the single-mode input waveguides into an N-mode multimode waveguide (i.e., spreading region) would optimize power efficiency.

For an optical signal modulator, the power required by each optical modulator, $P_{Mod}$, can be given by Equation 3, wherein $C_{Mod}$ is the capacitance of the modulator, and $V_{pp}$ is peak-to-peak driving voltage of the modulator.

$$P_{Mod} = \frac{1}{2} C_{Mod} V_{pp}^2 f_0 \tag{3}$$

The power required by each optical receiver (e.g., photodetector), $P_{PD}$, can be approximated by Equation 4, wherein $V_{bias}$ is a bias voltage of a PN junction (e.g., a PN junction of a photodiode comprising a photodetector of the optical receiver), $\mathcal{R}$ is responsivity (e.g., an electrical output of the photodetector per optical input to the photodetector comprising the optical receiver).

$$P_{PD} \approx V_{bias} \mathcal{R} P_{Rx} \qquad (4)$$

The total electrical power, $P_{elec}$, consumed by the photonic processing system for a kernel size of $\sqrt{N} \times \sqrt{N}$ and M outputs can therefore be calculated by Equation 5.

$$P_{total} = P_{laser}/\eta + N \times P_{mod} + M \times P_{PD} \qquad (5)$$

The total number of MACs per second is $N \times M \times f_0$. The energy consumption per MAC, $E_{MAC}$, is therefore given by $P_{total}/(N \times M \times f_0)$. After substituting Equation 1 into the expressions for $P_{laser}$ (Equation 2) and $P_{PD}$ (Equation 4), it can be seen in Equation 6 that total energy consumption per MAC, $E_{MAC}$, is independent of the modulation frequency.

$$E_{MAC} = \frac{2^{2ENOB} q}{\eta f \mathcal{R} \tau_{mod} \tau_{scatter} M} + \frac{C_{Mod} V_{pp}^2}{2M} + \frac{V_{bias} 2^{2ENOB} q}{N} \qquad (6)$$

To quantitatively compare the energy per MAC required by an embodiment of the photonic processing system with a conventional electronic GPU, specifications for optoelectronic components comprising the embodiment of the photonic processing system are assumed as follows. In embodiments, $C_{Mod\ m}$ay be on the order of 1 femtoFarad, $V_{pp}$ is about 1V, $V_{bias}$ is about 3.3V, and $\mathcal{R}$ is about 1 mA/mW at a wavelength of 1550 nanometers. In addition, insertion loss of an optical signal modulator can be about 6.4 dB (corresponding to a $T_{mod}$ of about 0.27). The wall-plug efficiency for distributed feedback lasers is about $\eta = 0.2$. The transmission through the scattering region, $T_{scatter}$, can be about 0.2. As N increases, an improvement in energy efficiency of the photonic processing system can be seen compared to the energy consumption of a GPU. For example, for a pixel block size of 8×8 pixels (i.e., N=64), the photonic processing system can consume 100× lower power than a conventional GPU. Further, the energy required by the photonic processing system decreases rapidly with pixel block size. While increasing the pixel block size improves efficiency of the photonic processing system, image reconstruction can also be degraded in some embodiments. However, it is contemplated that alternative inverse-designed transforms could enable large pixel block sizes without sacrificing image reconstruction fidelity. For example, the photonic processor can include a scattering region that is an inverse designed photonic structure. The scattering region can be configured (e.g., the scattering centers can be sized and located) to implement a matrix multiplication of an input vector by a quasi-random matrix. In other words, the scattering region may be designed such that it performs a random kernel transform (e.g., of a pixel block of a source image). Inversely designing the scattering region can, for example, minimize insertion losses associated with the scattering region, mitigate cross-talk, etc. Accordingly, the scattering region can be configured to enable large pixel block sizes without sacrificing reconstruction fidelity. Moreover, a majority of power consumption is consumed by the laser. Accordingly, a lower power consumption by the photonic processing system can be achieved if a lower ENOB value is sufficient for a given application. A lower ENOB value permits the use of a lower power laser in the photonic processing system.

The energy consumption per pixel, $E_{pixel}$, of the photonics processing system can be calculated as $P_{total}/(N \times f_0)$. The energy per pixel is independent of both modulation frequency and the size of the pixel blocks. Further, for an ENOB of 6 along with the optoelectronic parameters discussed herein, the energy per pixel of embodiments of the photonics processing system can be as low as about 72 femtojoules, which is significantly lower than the about 0.1 microjoules used in conventional image processing systems. Since more than 50% of energy consumed by conventional image processing systems is dedicated to image compression and conditioning, the photonics processing systems and methods described herein can significantly reduce overall energy consumption of image processing. Moreover, throughput of the photonics processing system, in terms of pixels per second, can be estimated as $N \times f_0$. For an exemplary pixel block size of 8×8 (i.e., N=64), the photonics processing system can process about 1 Terapixel per second of image data using a clock speed of about 16 GHz.

The photonic processing systems and associated methods disclosed or otherwise suggested herein have certain improved capabilities as compared to conventional systems and methods. For example, the photonic processing systems and methods can encode large scale image data with faster processing speeds and lower energy consumption. In another example, a parallel and all-optical encoding approach implemented by the photonic processing systems and methods can encode information at rates exceeding terapixels per second with energy consumption that is orders of magnitude lower compared to conventional electronic approaches. Furthermore, unlike conventional electronic approaches, the photonic processing systems and methods allow for image conditioning tasks (e.g., denoising) to be selectively moved from the encoding front end to the decoding backend. With the advantages described herein, use of such a low-power on-chip photonic processing system or method are of great significance for numerous applications, especially those applications related to remote sensing, surveillance, and global monitoring.

It will be appreciated that the scope of the general inventive concepts is not intended to be limited to the particular exemplary embodiments shown and described herein. From the disclosure given, those skilled in the art will not only understand the general inventive concepts and their attendant advantages but will also find apparent various changes and modifications to the methods and systems disclosed. It is sought, therefore, to cover all such changes and modifications as fall within the spirit and scope of the general inventive concepts, as described and claimed herein, and any equivalents thereof.

For example, a plurality of IC chips including the photonic processing system and/or performing the photonic-based processing method may be arranged in parallel to simultaneously process multiple input vectors (e.g., pixel blocks of a source image) to reduce processing time. Therefore, the general inventive concepts are not so limited and instead may involve arranging the photonic systems and methods in any suitable arrangement.

In another example, while the exemplary embodiments shown and described herein involve processing (e.g., compressing) black-and-white images, the inventive photonic processing systems and methods can also be utilized to compress other types of 2-dimensional data (e.g., grayscale image data, red-green-blue image data, hyperspectral image data, time-series image data, etc.) as well as arbitrary (non-image) data types, 1-dimensional data (e.g., speech, audio, text), and 3-dimensional data (e.g., video). Therefore, the general inventive concepts are not so limited and instead may be applicable to processing any suitable form of data.

In another example, as the photonic processing systems and methods mimic the first few layers of a neural network, the inventive photonic processing systems and methods can be utilized to perform other processing conventionally performed by a neural network. For example, it is contemplated that the photonic processing systems or methods described herein may be combined with a detector nonlinearity, such as thresholding or a quadratic nonlinearity (due to detection of intensity instead of electric field). Such a combination may allow for the performance of neural processing tasks such as classification in addition to or instead of compression. Furthermore, the photonic processing systems and methods can be used for other image processing tasks including denoising, generating inferences about what an image represents, classifying an image, reducing dimensionality of an image, or a combination thereof in addition to or instead of compressing an image. Therefore, the general inventive concepts are not so limited and instead may be applicable to performing other processes conventionally performed by neural networks.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A photonic processing system, comprising:
an optical encoder;
a photonic processor in optical communication with the optical encoder; and
an optical receiver in optical communication with the photonic processor;
wherein the optical encoder is configured to encode an input vector into first optical signals;
wherein the photonic processor includes a scattering region having scattering centers, wherein a refractive index of the scattering centers is different than a refractive index of a material of a remainder of the scattering region and is configured to:
receive the first optical signals;
perform an optical scattering on the first optical signals to form second optical signals, the optical scattering implementing a matrix multiplication of the input vector by a quasi-random matrix; and
output the second optical signals representing an output vector; and
wherein the optical receiver is configured to detect at least a portion of the second optical signals and output an electrical representation of the output vector; and
wherein the scattering centers are cylindrical voids extending through a thickness of the photonic processor, wherein the cylindrical voids have a refractive index of about 1, and wherein the refractive index of the material comprising the photonic processor is greater than 1.

2. The system of claim 1, wherein the scattering region is an inverse designed photonic structure that is configured to implement the matrix multiplication of the input vector by the quasi-random matrix.

3. The system of claim 1, wherein the photonic processor comprises a spreading region and a scattering region, wherein the spreading region is configured to spread the first optical signals into third optical signals, wherein the scattering region is configured to scatter the third optical signals into the second optical signals.

4. The system of claim 3, wherein the third optical signals comprise multi-modal light, wherein the third optical signals form a speckle pattern, and further wherein the speckle pattern is incident substantially across a width of an end of the scattering region.

5. The system of claim 1, wherein the first optical signals comprise single-mode light including a predefined wavelength.

6. The system of claim 5, further comprising a photonic crystal disposed along a side of the photonic processor, wherein the photonic crystal supports a band gap approximately at the predefined wavelength.

7. The system of claim 5, wherein the optical encoder comprises a plurality of optical signal modulators, the system further comprising waveguides in optical communication with the optical signal modulators and the photonic processor, wherein the waveguides are configured to transmit the first optical signals from the optical signal modulators to the photonic processor.

8. The system of claim 1, further comprising an output port having spatial regions, wherein the portion of the second optical signals corresponds to one of the spatial regions.

9. A photonic processing system, comprising:
an optical encoder;
a photonic processor in optical communication with the optical encoder; and
an optical receiver in optical communication with the photonic processor;
wherein the optical encoder is configured to encode an input vector into first optical signals;
an output port having spatial regions;
wherein the photonic processor is configured to:
receive the first optical signals;
perform an optical scattering on the first optical signals to form second optical signals, the optical scattering implementing a matrix multiplication of the input vector by a quasi-random matrix; and
output the second optical signals representing an output vector; and
wherein the optical receiver is configured to detect at least a portion of the second optical signals and output an electrical representation of the output vector,
wherein:
the quantity of optical receivers corresponds to at least one of a size of the output vector or the quantity of spatial regions;
the quantity of optical signal modulators corresponds to at least one of a size of the input vector or a size of the quasi-random matrix; and
a ratio of the quantity of the optical signal modulators to the quantity of the optical receivers corresponds to a compression ratio; and
wherein the portion of the second optical signals corresponds to one of the spatial regions.

10. A method for photonically processing data, the method comprising:

encoding an input vector into first optical signals;

performing an optical scattering of the first optical signals to form second optical signals, the optical scattering implementing a matrix multiplication of the input vector by a quasi-random matrix;

detecting at least a portion of the second optical signals representing an output vector; and encoding the second optical signals in an electrical representation of the output vector; encoding a second input vector into third optical signals;

performing an optical scattering of the third optical signals to form fourth optical signals, the optical scattering implementing a matrix multiplication of the second input vector by the quasi-random matrix;

detecting the fourth optical signals representing a second output vector; and encoding the fourth optical signals in an electrical representation of the second output vector;

wherein the second input vector corresponds to second pixels comprising a second pixel block of the source image;

wherein the pixel block and the second pixel block are non-overlapping;

wherein:

elements of the input vector correspond to pixels in a source image, the pixels comprise a pixel block of the source image, and the source image comprises pixel blocks.

11. The method of claim 10, wherein the optical scattering comprises spreading the first optical signals to form third optical signals and scattering the third optical signals to form the second optical signals, further wherein the first optical signals comprise single-mode light and the third optical signals comprise multimodal light.

12. The method of claim 10, further comprising:

decoding the electrical representation of the output vector to generate a first reconstructed pixel block;

decoding the electrical representation of the second output vector to generate a second reconstructed pixel block; and combining the first reconstructed pixel block and the second reconstructed pixel block to generate a reconstructed image, wherein the reconstructed image includes fewer pixels than the source image.

13. The method of claim 12, further comprising at least one of:

conditioning at least one of the electrical representations of the output vectors;

conditioning at least one of the reconstructed pixel blocks; and conditioning the reconstructed image.

\* \* \* \* \*